(12) United States Patent
Scheucher et al.

(10) Patent No.: US 7,884,722 B2
(45) Date of Patent: Feb. 8, 2011

(54) DATA CARRIER COMPRISING STRAIN GAUGE MEANS

(75) Inventors: Heimo Scheucher, Langegg (AT); Ewald Bergler, Weiz (AT)

(73) Assignee: NXP B.V., Eindhoven (NL)

(*) Notice: Subject to any disclaimer, the term of this patent is extended or adjusted under 35 U.S.C. 154(b) by 312 days.

(21) Appl. No.: 12/293,814

(22) PCT Filed: Mar. 23, 2007

(86) PCT No.: PCT/IB2007/051022

§ 371 (c)(1),
(2), (4) Date: Sep. 20, 2008

(87) PCT Pub. No.: WO2007/113722

PCT Pub. Date: Oct. 11, 2007

(65) Prior Publication Data

US 2010/0225483 A1    Sep. 9, 2010

(30) Foreign Application Priority Data

Mar. 30, 2006    (EP) .................................. 06111969

(51) Int. Cl.
G08B 13/14    (2006.01)

(52) U.S. Cl. .................. 340/572.3; 340/572.1; 340/665

(58) Field of Classification Search .............. 340/572.3, 340/572.4, 572.8, 572.1, 10.51, 665; 327/509; 235/492

See application file for complete search history.

(56) References Cited

U.S. PATENT DOCUMENTS

| 5,060,261 | A | 10/1991 | Avenier et al. |
| 6,906,514 | B2 | 6/2005 | Ausserlechner |
| 7,604,177 | B2 * | 10/2009 | Konuma et al. .............. 235/492 |
| 2002/0106988 | A1 | 8/2002 | Davie et al. |
| 2005/0242957 | A1 | 11/2005 | Lindsay et al. |
| 2007/0096882 | A1 * | 5/2007 | Bandy et al. .............. 340/10.51 |

FOREIGN PATENT DOCUMENTS

| DE | 19947180 A1 | 4/2001 |
| JP | 02307792 A | 12/1990 |

* cited by examiner

Primary Examiner—Ahn V La

(57) ABSTRACT

A data carrier (2) comprises a data circuit (4) arranged on a substrate (3) and data transmission unit (10) being connected to the data circuit (4). The data carrier (2) further comprises at least one strain gauge unit (7) being adapted to measure strains exerted on the substrate (3) and to transmit a deactivating signal (DE) to the data circuit (4) if the measured strains exceed a defined deactivating strain threshold. If the data circuit (4) receives the deactivating signal (DE), the data circuit (4) interrupts a data exchange with an external data reader/writer (1) via the data transmission unit (10).

17 Claims, 3 Drawing Sheets

DATA CARRIER COMPRISING STRAIN GAUGE MEANS

FIELD OF THE INVENTION

The invention relates to a data carrier comprising a data circuit arranged on a substrate and data transmission means being connected to the data circuit.

BACKGROUND OF THE INVENTION

RFID or contact data carriers are, for example, used for the identification of goods, documents, animals and persons, e.g. in passports, driver licences, ID cards, health cards, banking cards, animal ID tags, special company cards, security cards, and the like. For instance, in medical and clinical applications, RFID data carriers are employed to identify medical goods, e.g. medicines, injections, vaccines, etc. Data carriers that are used in said fields have a typical thickness of 380 µm and less (down to 30 µm and even below, dependent on the application and fab and grinding/etching/polishing technology), and there is a tendency to ever reduce the thickness of the data carriers. This means that the wafers for manufacturing the data carriers in form of integrated circuits are as thin as paper and are bendable and twistable. It should also be mentioned that the substrates on which the ICs are defined often consist of flexible materials. However, bending and twisting, or in more general terms, exerting strains on the data carrier may cause malfunction of the data carrier or at least may result in operating the data carrier outside of its specification.

Document US 2005/0242957 A1 suggests to deactivate a data tag attached to the packaging for user privacy or tamper-indicating reasons. The data tag comprises a data circuit that stores identification information, like personal data, health information, security access data, money values and the like. A plurality of antennae is coupled to the data circuit. At least one antenna of the plurality of antennae is a removable antenna capable of wireless signal transmission at a first range such that removal of the antenna substantially prevents communication of the identification information via the removed antenna and permits communication of the identification information via another antenna. "Removal" of the first antenna is carried out by switching a load-sensitive switch into the electric path between the data circuit and the first antenna. This implementation can for instance be used to create an orientation-sensitive RFID chip container. In another embodiment, the data circuit is arranged at the body of a container, whereas the first antenna is arranged on a lid of the container. As long as the lid is appropriately positioned on the body of the container, an electrical connection between the data circuit and the first antenna is maintained. When the lid is removed from the body, the first antenna is physically disconnected from the data circuit, so that no wireless signals can be transmitted via the first antenna.

With this known solution, however, the data circuit is not aware whether or not signals can be transmitted via the first antenna. Thus, such a solution is only applicable to simple data tags that are basically adapted to transmit identification information as soon as they come into the range of a data reader, e.g. an RFID reader. A further disadvantage of this known system is that it depends on displacement of mechanical components, like wires, tongues of a switch and the like, which tend to be unreliable. Further, these mechanical components have to be positioned manually, which increases the manufacturing costs.

OBJECT AND SUMMARY OF THE INVENTION

It is an object of the invention to provide a data carrier of the type defined in the opening paragraph, in which the disadvantages defined above are avoided.

In order to achieve the object defined above, a data carrier according to the invention comprises characteristic features, so that a data carrier according to the invention can be characterized in the way defined below, that is:

A data carrier comprising a data circuit arranged on a substrate and data transmission means being connected to the data circuit, wherein the data carrier comprises at least one strain gauge means being adapted to measure strains exerted on the substrate and to transmit a deactivating signal to the data circuit if the measured strains exceed a defined strain threshold, the data circuit being adapted to interrupt data exchange with an external data reader/writer via the data transmission means, if it receives the deactivating signal.

The term "strain" as used herein is defined as the amount of deformation of a body due to an applied force. More specifically, strain is defined as the fractional change in length. Strain can find its expression in tension, compression, warpage, bending and twisting of a body.

The characteristic features according to the invention provide the advantage that the decision, whether or not a communication between the data carrier and an external data reader/writer is maintained in case of strain occurring on the data carrier, is taken by the logics of the data carrier, so that the data circuit has full control over this decision and is not dependent on external events like actuating a switch or breaking a conductor. This offers the opportunity to easily implement various operating modes of the data carriers on the occurrence of strains. For instance, it can be chosen whether the interruption of communication should be maintained temporarily or permanently. Further, logging of the occurrence of strains is an option. The solution of the present invention can also be used to test data circuits after they have been cut from a wafer.

It should be noted that document U.S. Pat. No. 6,906,514 B2 describes a system concept for decreasing or compensating influences of external disturbing quantities, such as, for example, mechanical stress in a semiconductor material, on the physical functional parameters of integrated circuits. The focus of attention of this system concept, however, is not directed to potential damage by mechanical stress in the semiconductor material, but basically to the influence of physical parameters of the semiconductor material as a result of this mechanical stress which can, for instance, influence the electrical and magnetic characteristics of an integrated sensor assembly, such as a Hall sensor assembly. In this system concept, the mechanical stress in the semiconductor material is regarded as a type of excitation energy which has to be added to the energy balance in the semiconductor material. Consequently, in this known concept a compensation circuit is provided, such as a control loop, converting the essential components of the stress tensor acting on the semiconductor material into a signal which is employed to control the integrated circuit in such a way that the influence of the stress tensor on the output signal of the integrated circuit is decreased considerably or compensated completely. This known concept, however, does not suggest to interrupt data exchange between the integrated circuit and an external device.

In a preferred embodiment of the invention, the strain gauge means comprise at least one strain sensor arranged on the substrate and a strain evaluating circuit having a measuring input that is connected to the strain sensor, wherein the strain sensor delivers a physical quantity that corresponds to the strains exerted on the substrate, and the strain evaluating circuit is adapted to compare the physical quantity delivered by the strain sensor with a threshold value of the physical quantity that corresponds to a deactivating strain threshold and to generate the deactivating signal if the physical quantity of the strain sensor exceeds the threshold value of the physical quantity. In this configuration, various types of strain sensors can be used, like discrete electrical resistors with strain-dependent resistance values, or piezoresistor semiconductors, or even MEMS (Micro Electronic Mechanical Sensor) technology.

In order to achieve cheap manufacturing in combination with reliable operation of the data carrier, in an embodiment of the invention the at least one strain sensor comprises at least one electric resistor having a resistance value that varies with the strain exerted on the resistor.

Due to its good sensitivity, high degree of accuracy and achievable value ranges as well as due to its easy integration in the manufacturing process of integrated circuits, it is preferred to configure the electric resistor as a poly resistor.

In order to multiply the sensitivity of the strain sensor being configured as a strain-dependent electric resistor, it is preferred to arrange the resistor on the substrate in a meandering configuration. The meandering configuration multiplies the length of the resistor, e.g. comparable to a coil with a plurality of windings. The resistance R of a resistor is calculated by the formula:

$$R = \rho \times L/A$$

where $\rho$ is the resistivity of the resistor, and L and A are its length and cross-sectional area, respectively.

In diffused semiconductor layers, resistance is a strong function of depth. For circuit design, it is often convenient to work with a parameter called the "sheet resistance" (Rs). If W is the width of the sample and t is its thickness (i.e. A=Wt), then the resistance can be written as:

$$R = (\rho/t)(L/W) = Rs(L/W)$$

where $Rs=\rho/t$ is the sheet resistance of a layer of this material.

Strictly speaking, the unit for the sheet resistance Rs is the Ohm (since L/W is unitless). To avoid confusion between R and Rs, however, sheet resistance is specified in the unit "Ohms per square." The L/W ratio can be thought of as the number of unit squares (of any size) of material in the resistor.

Taking into account that strain on the resistor results in a varying length (L+$\Delta$L) and width (W+$\Delta$W) of the resistor, the strain dependent resistance is expressed by the formula:

$$R = Rs((L+\Delta L)/(W+\Delta W))$$

This explains why employing a meandering configuration of the resistor yields a higher sensitivity.

Various expressions of strain, particularly warpage and twisting, usually have the highest impacts on the peripheral regions of the substrate. Also bending of the substrate occurs in many cases in peripheral regions of the substrate. Hence, these peripheral regions are most vulnerable to damage. Taking this into account, it is advantageous to arrange the at least one strain sensor in peripheral regions of the substrate.

The highest reliability in monitoring strain exerted on the data circuit can be achieved when the at least one strain sensor is configured to encompass the data circuit at least partly.

In order to take the form factor of the substrate as well as anisotropic stiffness of the substrate into consideration, in a further embodiment of the data carrier according to the invention, the cross-sectional area and/or the meandering shape of the electric resistor is varied in different sections of the electric resistor. For instance, the sections of the resistor that extend along the transversal direction of the substrate might differ in the number or length of meandering windings per length unit from those sections of the resistor that extend along the longitudinal direction of the substrate.

In another embodiment of the invention that doubles the sensitivity of strain measurement, at least a first strain sensor is arranged on an upper surface or embedded in an upper layer of the substrate and at least a second strain sensor is arranged on a lower surface or embedded in a lower layer of the substrate, wherein preferably the first and second strain sensors are arranged in alignment with each other, and the difference between the output signals of the first and second strain sensors is used to evaluate the strain exerted on the substrate.

In yet another embodiment of the invention, a plurality of strain sensors are provided, wherein the output signals of the plurality of strain sensors are evaluated independently. Optionally, different deactivating strain thresholds are defined for the strain sensors. This measure enables different vulnerabilities of the data circuit to be taken into consideration by exerting strains in different directions of the substrate.

An accurate evaluation of the strains exerted on the substrate can be achieved by switching the strain-dependent electrical resistor into a bridge circuit being adapted to measure the resistance of the strain-dependent electrical resistor. As has been already explained above, the sensitivity of strain evaluation can be doubled when the first and the second strain sensors are configured as strain-dependent resistors and are switched into a bridge circuit, wherein the bridge circuit is adapted to measure the difference between the resistance values of the two strain-dependent resistors.

According to the invention, the data carrier can be operated in different modes. In a first operating mode, the interruption of data transmission via the data transmission means is maintained only as long as the deactivating signal occurs. This means that as long as there is a risk that due to strains exerted on the substrate (and consequently also on the data circuit) the exchanged data may be unreliable or corrupted, the exchange of the data is interrupted. On the other hand, when the strain is relieved, the data circuit resumes the exchange of data with an external data reader/writer. Therefore, the data carrier must not be discarded after temporary strains have occurred. This temporary deactivating of the data carrier differs from the behavior of prior art strain detection means which permanently disable a data carrier on occurrence of strains, for instance by breaking a supply line or physically removing an antenna.

In order to enable logging of strains that have been exerted on the data carrier during its lifetime, in another embodiment of the present inventive data carrier temporary occurrences of the deactivating signal are permanently stored in the data circuit and this information can be read out by an external reading device. This technology can be used in many fields of application, for instance in identifying patients via personal ID, in health cards, passports, etc. It should be observed that the present invention is applicable to contactless data carriers as well as to contact IC cards and even to advanced package solutions with very thin silicon, for instance in SIP (System In Package) technology.

In critical applications, like identifying medical goods, i.e. medicines, injections, etc., it might nevertheless be necessary to permanently interrupt data exchange, even if the strain on the data carrier has occurred merely temporarily. By permanently disabling continued data exchange any risk is excluded that a theoretical malfunction of the data carrier due to the exerted strains might result in harm to patients.

Another operating mode of the data carrier according to the invention discriminates between such strains on the data carrier that—although exceeding a given deactivating strain threshold—are regarded weak enough not to damage the data carrier, so that a temporary interruption of data exchange is a sufficient matter of precaution in order to avoid possible transmission of corrupted data and higher strains that exceed a given damaging strain threshold. In the latter case, permanent damage to the data carrier has to be feared, so that as a matter of precaution the data circuit will permanently interrupt data exchange with an external data reader/writer via the data transmission means.

Strain sensors often show some temperature-dependent behavior. This temperature dependency of strain sensors is employed in another embodiment of the invention by monitoring the output signal of the strain sensor and logging changes that have been influenced by varying temperatures. This, for instance, enables the data carriers of the present invention to be used for monitoring whether the goods, to which the data carriers are affixed, have been stored below a prescribed cooling temperature.

The aspects defined above and further aspects of the invention will be apparent from the exemplary embodiments to be described hereinafter and will be explained with reference to these exemplary embodiments.

BRIEF DESCRIPTION OF THE DRAWINGS

The invention will be described in more detail hereinafter with reference to exemplary embodiments. However, the invention is not limited to these exemplary embodiments. Particularly, although an embodiment described in detail below comprises a contactless data carrier configured as an RFID data carrier that comprises RFID data transmission means, the invention is not limited to contactless data carriers, but also comprises contacted data carriers, like those used in banking cards and credit cards, having data transmission means that are configured as electrical conductors with terminating contact pads. For reading/writing data from/to the data carrier, the contact pads are touched by electrical contacts of a data reader/writer.

DESCRIPTION OF EMBODIMENTS

Figure 1:
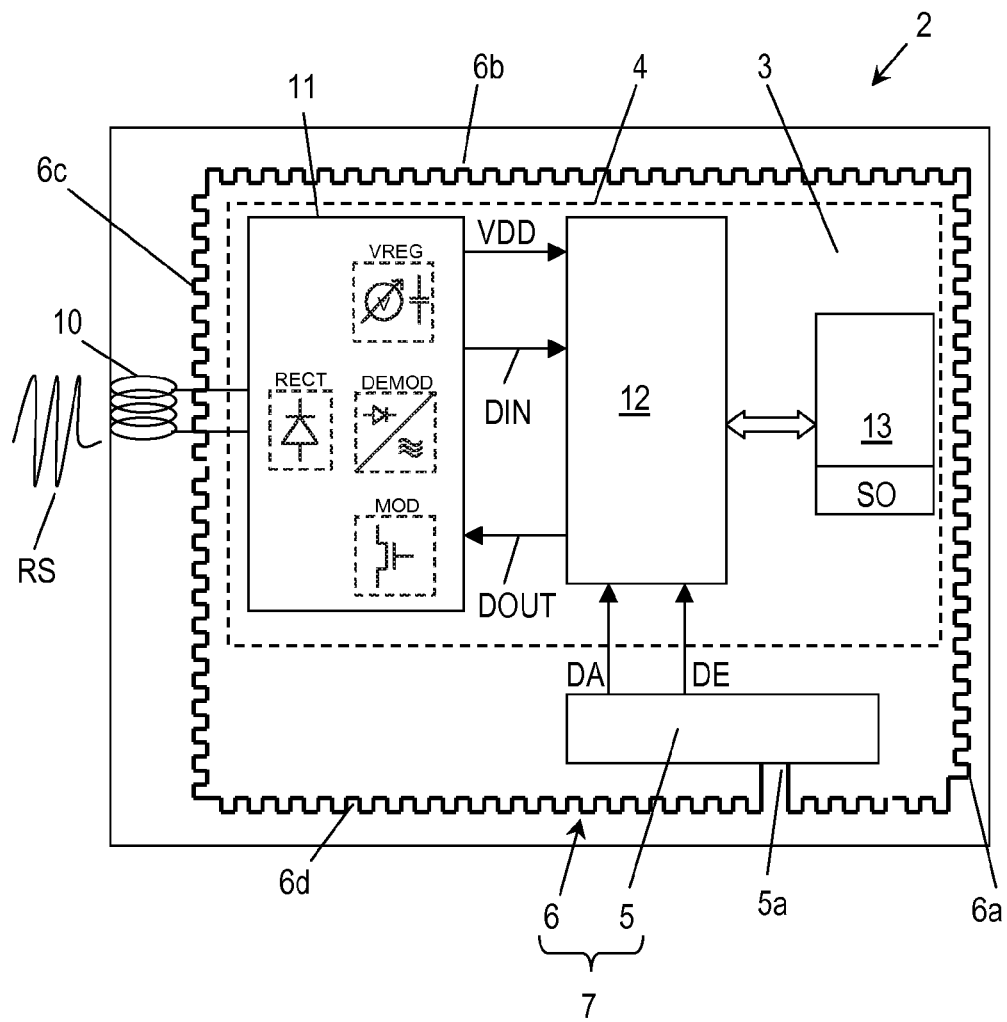
FIG. 1 shows a schematic block circuit diagram of an RFID system comprising a data carrier according to the invention.
Figure 1:
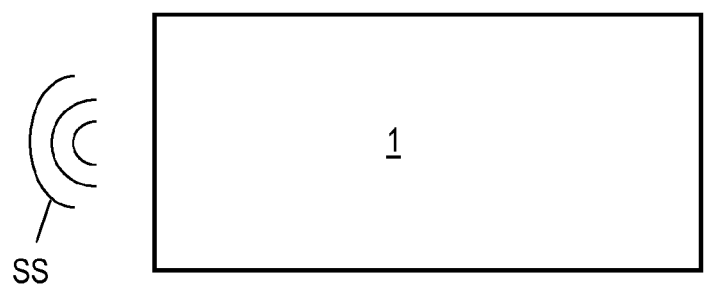

FIG. 1 shows a schematic block circuit diagram of an RFID (Radio Frequency Identification) system comprising an RFID data reader/writer 1 and a data carrier 2 configured as an RFID tag. The RFID data reader/writer 1 may be of conventional design, so it needs not to be explained in more detail. It is sufficient to mention that the RFID data reader/writer 1 communicates with the data carrier 2 in a contactless manner via RF data transmission means by modulated electromagnetic signals SS, provided the data carrier 2 is within a transmission and receiving range of the RFID data reader/writer 1. The electromagnetic signals SS spread from the RFID data reader/writer 1 may be used for both transmitting data to the data carrier 2 and energizing the data carrier 2 if it is configured as a passive tag. In normal operating mode, the data carrier 2 responds to the RFID data reader/writer 1 by modulating the received electromagnetic signals SS. A data exchange between the RFID data reader/writer 1 and the data carrier 2 may be accomplished by standard data transmission protocols and standard modulation methods. For instance, the electromagnetic signals SS sent from the RFID data reader/writer 1 to the data carrier 2 are configured as a pulse-width modulated signal. The logic response signals RS from the data carrier 2 to the RFID data reader/writer 1 are e.g. load-modulated signals, i.e. a carrier signal or sub-carrier signal contained in the electromagnetic signal SS is modulated by switching a load impedance connected to the antenna of the data carrier 2, so that varying energy is drawn from the carrier signal or sub-carrier signal. Switching the load impedances in the data carrier 2 causes a change of the impedance of the antenna of the RFID data reader/writer 1 and hence a varying amplitude of the voltage at the antenna of the RFID data reader/writer 1.

The exemplary embodiment of the data carrier 2 according to the invention, which is configured as a passive RFID tag, comprises RF data transmission means 10 in form of an antenna, an analogue radio frequency interface 11 that is connected to the RF data transmission means 10, a digital control unit 12 that is connected to the analogue radio frequency interface 11, and a memory 13 that is connected to the digital control unit 12. The analogue radio frequency interface 11, the digital control unit 12 and the memory 13 together constitute a data circuit 4 that is arranged on a substrate 3. It should be mentioned that the memory 13 is preferably embodied as a non-volatile memory, such as e.g. an EEPROM, Flash memory, MTP, OTP, RAM/ROM/DRAM, FE-RAM, or MRAM, so that data written into the memory 13 during a communication with the RFID data reader/writer 1 remains stored in the memory 13 even when the data carrier 2 is switched off (e.g. because the data carrier 2 has left the transmitting range of the RFID data reader/writer 1 and is therefore no longer energized by the RFID data reader/writer 1). Memory 13 may also contain a program code for operating the digital control unit 12 and a unique identification number. RF data transmission means 10 receive the electromagnetic signals SS from the RFID data reader/writer 1 and pass them to the analogue radio frequency interface 11. In general, the analogue radio frequency interface 11 comprises a rectifier REG and a voltage regulator VREG with an integrated energy storage element (e.g. a capacitor) to derive, from the received electromagnetic signals SS, a necessary operating voltage VDD for the digital control unit 12 and the memory 13. Furthermore, the analogue radio frequency interface 11 comprises a demodulator DEMOD to extract data DIN from the electromagnetic signals SS and pass them to the digital control unit 12. The digital control unit 12 processes the received data DIN and may respond to the RFID data reader/writer 1 by creating output data DOUT and passing them to the analogue radio frequency interface 11. Furthermore, the analogue radio frequency interface 11 comprises a modulator MOD which is able to modulate the output data DOUT and transmit the modulated signals as response signals RS via the RF data transmission means 10.

According to the invention, the data carrier 2 further comprises at least one strain gauge means 7 being adapted to measure strains exerted on the substrate 3, and hence indirectly measure strains exerted on the data circuit 4, and to transmit a deactivating signal DE to the data circuit 4, strictly speaking, to the digital control unit 12 of the data circuit 4, if the measured strains exceed a defined deactivating strain threshold. The data circuit 4 is adapted to interrupt data exchange with the RFID data reader/writer 1 via the RF data transmission means 10, if it receives the deactivating signal DE.

The strain gauge means 7 comprises a strain sensor 6 arranged on the substrate 3 and a strain evaluating circuit 5 having a measuring input 5a that is connected to the strain sensor 6. The strain sensor 6 delivers a physical quantity that corresponds to the strains exerted on the substrate 3, and the strain evaluating circuit 5 is adapted to compare the physical quantity delivered by the strain sensor 6 with a threshold value of the physical quantity that corresponds to a deactivating strain threshold and to generate the deactivating signal DE if the physical quantity of the strain sensor 6 exceeds the threshold value of the physical quantity. The strain sensor 6 is configured as an electric resistor having a resistance value that varies with the strain exerted on the resistor. Preferably, the electric resistor is configured as a poly resistor. The strain sensor 6 is preferably arranged in a peripheral region of the substrate 3, so that it encompasses the data circuit 4, the electric resistor being applied in a thin meandering configuration. The strain sensor 6 configured as a resistor comprises four sections 6a, 6b, 6c, 6d, each located close to one of the four edges of the substrate 3, and the cross-sectional area and/or the meandering shape of the sections of the electric resistor possibly differing from each other in order to compensate anisotropic stiffness of the substrate 3. Examples of the strain evaluating circuit 5 will be given below.

Interruption of data exchange between the RFID data reader/writer 1 and the data carrier 2 in the event of the occurrence of the deactivating signal DE can be handled in different ways. In a first operating mode of the data carrier 2, the digital control unit 12 of the data circuit 4 interrupts a data exchange with the RFID data reader/writer 1 only temporarily when the deactivating signal DE occurs. When the deactivating signal DE disappears, because the strain exerted on the data carrier 2 has been relieved, the digital control unit 12 resumes the communication with the RFID data reader/writer 1. The term "interruption" of data exchange between the data carrier 2 and the RFID data reader/writer 1 as used herein means that the digital control unit 12 does not send data via the RF data transmission means 10, even if requested by the RFID data reader/writer 1, and disregards any data received from the RFID data reader/writer 1. Due to this behavior, on the one hand, the risk is significantly reduced that erroneous data—which have been corrupted in the data carrier 2 due to the exerted strains—will be used for further processing. On the other hand, when the deactivating signal DE disappears, data exchanged between the RFID data reader/writer 1 and the data carrier 2 is regarded as reliable and hence can be used for further processing.

However, even if the strains exerted on the data carrier 2 have been relieved and the data carrier 2 has resumed normal data exchange with the RFID data reader/writer 1 or a contact data reader/writer for maintenance or warranty inspections or the like, it might nevertheless be useful to know whether during the lifetime of the data carrier 2 the deactivating signal DE has occurred at least once. In order to enable such a logging of strains, a strain occurrence flag SO is provided within the non-volatile memory 13. This strain occurrence flag SO is set by the digital control unit 12 on each occurrence of the deactivating signal, but will not be reset. A status of the strain occurrence flag SO can be read out from the non-volatile memory 13 by an external reading device, like the RFID data reader/writer 1.

While a temporary interruption of the data exchange between the data carrier 2 and the RFID data reader/writer 1 on the occurrence of strains exerted on the data carrier 2 is appropriate in most applications, it might not be the best choice for every application. For instance, in critical applications, such as identification of medical goods (i.e. medicine, injections, etc.) it might be necessary for security reasons to permanently interrupt data exchange even if only temporary strains have been exerted on the data carrier 2. Although such an operating mode of the data carrier 2 renders the goods, on which the data carrier 2 is positioned, void, this is accepted in order to exclude that malfunction of the data carrier 2 due to exerted strains could result in harm to patients.

Permanent interruption of data exchange between the data carrier 2 and the RFID data reader/writer 1 can, for example, be chosen for another reason: In the manufacture of the data carriers 2, a plurality of data circuits 4 are formed on a wafer. The data circuits 4 undergo a lot of functional tests during which they are still arranged on the wafer. After the functional tests, the wafers are cut in order to separate the data circuits 4. After a cutting procedure, the data circuits 4 are usually fixed to a carrier, like a plastic or paper card or textiles, and are bonded to an antenna. These finishing manufacturing steps are the most critical ones, since the data circuits 4 are exposed to mechanical strains as well as to thermal and sometimes chemical stress. After the data carrier product has been finished, usually merely a short final functional test is carried out. However, due to time pressure in the production plants the final functional test cannot include full functional test procedures.

Therefore, sometimes a data carrier product is released although it contains some defects that are the result of strains exerted on the data carrier 4 during the final manufacturing steps, e.g. caused by sawing misalignment, die crack, metal peel off, etc. Such a defect may be, for instance, that only a part of the non-volatile memory 13 can be used, because one or more memory cells or lines of the data bus have been broken. In order to reduce the risk of delivery of such products, it is appropriate that excessive strains, which have changed parameters of the data carrier product permanently (which changed parameters are measured by the strain gauge means 7), cause the strain gauge means 7 to generate the deactivating signal DE which results in a permanent deactivation of the data carrier 2. For instance, when the strain gauge means 7 comprise a strain sensor which is incorporated as an electrical resistor which changes its resistance in dependence on exerted strains, the resistor may have been broken by excessive strains (resistance becomes infinite), or may have been permanently stretched by bending, twisting etc. (permanent increase of the resistance).

Optionally, the strain gauge means 7 can also be adapted to transmit a damage signal DA to the digital control unit 12 of the data circuit 4 if the measured strains exceed a defined damaging strain threshold, the data circuit 4 being adapted to permanently interrupt the data exchange with an external RFID data reader/writer 1 via the RF data transmission means 10 if the damaging signal DA is received.

In yet another operating mode of the data carrier 2, both the deactivating signal DE and the damage signal DA are used to discriminate between strains on the data carrier 4 that exceed a given deactivating strain threshold (but are regarded not to damage the data carrier 2) and strains that exceed a higher damaging strain threshold, so that permanent damage of the data carrier 2 has to be feared. In the first case, i.e. when the deactivating signal DE is generated, a temporary interruption of data exchange is regarded as a sufficient measure of precaution in order to avoid possible transmission of corrupted data. In order to cope with the latter case, the data circuit 4 is adapted to permanently interrupt the data exchange with the RFID data reader/writer 1.

Figure 2:
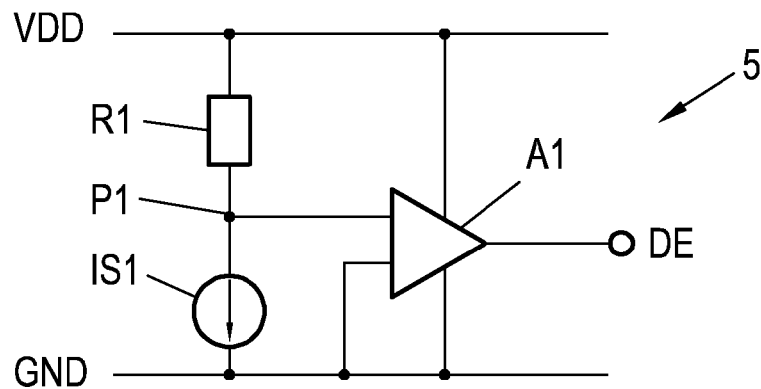
FIG. 2 shows a schematic circuit diagram of a strain evaluating circuit to be used in a data carrier according to the invention.

FIG. 2 shows a schematic circuit diagram of a strain evaluating circuit 5 to be used in the data carriers 2 according to the present invention. This strain evaluating circuit 5 is configured as a single-bridge circuit, wherein a strain sensor in form of a strain-dependent resistor R1 and a constant current source IS1 are connected in series between the supply voltage VDD and ground potential GND, so that they form a voltage divider. A voltage dividing point P1 between the resistor R1 and the constant current source IS1 is connected to an input of an amplifier A1. An output signal of the amplifier A1 constitutes the deactivating signal DE. It should be observed that this basic circuit can be varied in various ways. For instance, the amplifier A1 could be replaced by an inverter. Alternatively, a comparator can be provided behind the amplifier A1 having one input connected to the output of the amplifier A1 and having a second input connected to a reference voltage that represents a deactivating strain threshold. In such a configuration, the output of the comparator constitutes the deactivating signal DE.

Figure 3:
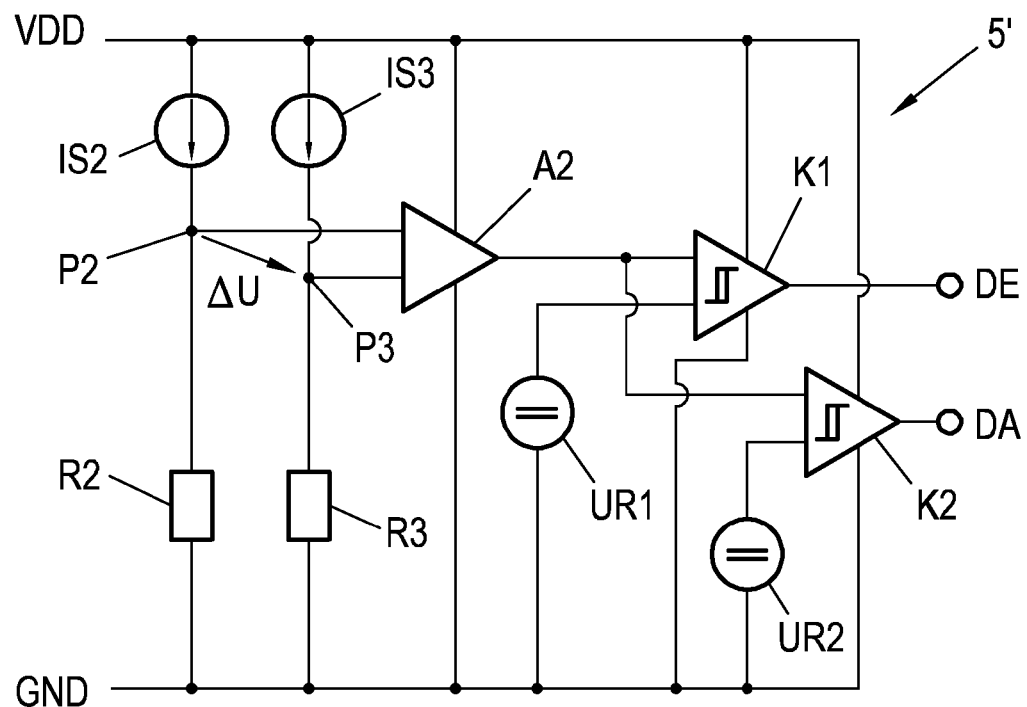
FIG. 3 shows a schematic circuit diagram of an alternative strain evaluating circuit to be used in a data carrier according to the invention.

FIG. 3 shows a schematic circuit diagram of another strain evaluating circuit 5' to be used in data carriers 2 according to the present invention. This alternative strain evaluating circuit 5' is configured as a modified Wheatstone bridge. In this strain evaluating circuit 5', a first strain sensor in form of a first strain-dependent resistor R2 and a first constant current source IS2 are connected in series between a supply voltage VDD and ground potential GND, so that they form a voltage divider with a first voltage dividing point P2 between the first resistor R2 and the first constant current source IS2. The first resistor R2 and the first constant current source IS2 connected in series constitute a first arm of the modified Wheatstone bridge. A second strain sensor in form of a second strain-dependent resistor R3 and a second constant current source IS3 are connected in series between the supply voltage VDD and ground potential GND, so that they form a voltage divider with a second voltage dividing point P3 between the second resistor R3 and the second constant current source IS3. The second resistor R3 and the second constant current source IS3 connected in series constitute a second arm of the modified Wheatstone bridge. The currents delivered by the first and second constant current sources IS2, IS3 and the resistances of the strain-dependent resistors R2, R3 are set so that the voltage difference ΔU appearing across the voltage dividing points P2, P3 is substantially zero when no strain is exerted on the resistors R2, R3, but deviates from zero when strains are exerted on the resistors R2, R3 due to different changes of the resistances of the respective resistors R2, R3. The voltage difference ΔU is fed to the input of an amplifier A2.

The output signal of the amplifier A2 is fed to an input of a first comparator K1 having a second input connected to a first reference voltage UR1 that is representative of the deactivating strain threshold. When the output signal of the amplifier A2 exceeds the first reference voltage UR1, the first comparator K1 generates the deactivating signal DE.

The output signal of the amplifier A2 is also fed to an input of a second comparator K2 having a second input connected to a second reference voltage UR2 that is representative of a damaging strain threshold. When the output signal of the amplifier A2 exceeds the second reference voltage UR2, the second comparator K2 generates the damage signal DA. Both the deactivating signal DE and the damage signal DA are supplied to the digital control unit 12 (shown in FIG. 1).

Figure 4:
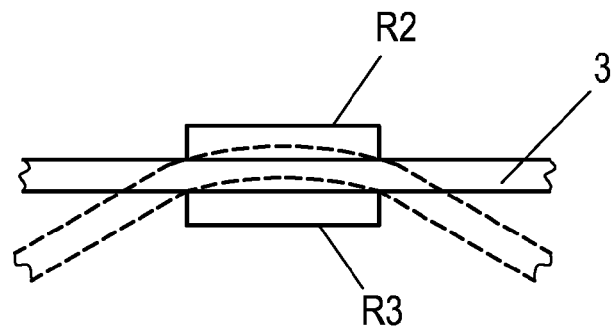
FIG. 4 shows a side view of the arrangement of strain sensors on opposite surfaces of a substrate.

In an advantageous configuration of the circuit of FIG. 3, the first strain-dependent resistor R2 is arranged on an upper surface of the substrate 3 and the second strain-dependent resistor R3 is arranged on a lower surface of the substrate 3, as shown in the side view of FIG. 4. As will be noted, the first and second resistors R2, R3 are arranged in alignment with each other on opposite surfaces of the substrate 3. Hence, when a bending force is exerted on the substrate 3, as shown in dotted lines, this bending force results in a tension force being applied to the first resistor R2 and a compression force being applied to the second resistor R3, resulting in an increase of the resistance of the first resistor R2 by an amount of ΔR, and a decrease of the resistance of the second resistor R3 by approximately the same amount ΔR. Since the resistors R2, R3 are positioned in different arms of the modified Wheatstone bridge, the sensitivity of the bridge is doubled by this arrangement. On the other hand, temperature-dependent changes of the resistances of the resistors R2, R3 have the same sign for both resistors and will therefore be cancelled out. It should be observed that although in this example only one first strain-dependent resistor R2 has been arranged on an upper surface of the substrate 3 and only one second strain-dependent resistor R3 has been arranged on a lower surface of the substrate 3, according to the invention also a plurality of strain-dependent resistors may be arranged on the upper surface and a plurality of strain-dependent resistors may be arranged on the lower surface of the substrate in alignment with the resistors on the upper surface. It should also be observed that the resistors need not be placed on the upper and lower surfaces of the substrate, but may also be embedded in, respectively, upper and lower layers of the substrate, like in a first or second poly-silicon layer, an active layer, an n-well layer, a p-well layer, or the like.

Figure 5:
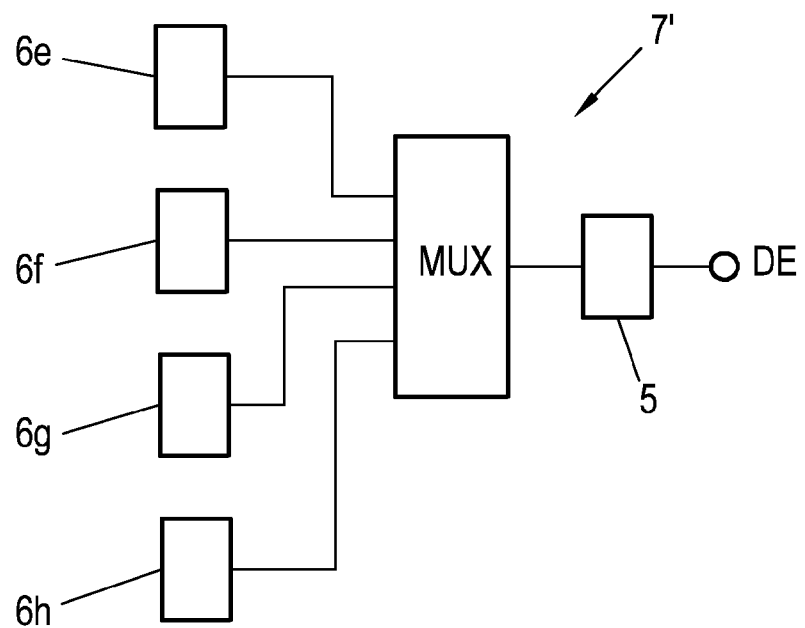
FIG. 5 shows a schematic block circuit diagram of an alternative configuration of strain gauge means.

FIG. 5 shows a schematic block circuit diagram of an alternative configuration of strain gauge means 7' to be used in the present invention. In this configuration, four separate strain sensors 6e, 6f, 6g, 6h are provided, whose output signals are fed to the inputs of a multiplexer MUX. An output of the multiplexer MUX is fed to the input of the strain evaluating circuit 5. If the strains exerted on the strain sensors 6e, 6f, 6g, 6h exceed a deactivating strain threshold in one ore more of the strain sensors 6e, 6f, 6g, 6h, the strain evaluating circuit 5 generates the deactivating signal DE.

The invention claimed is:

1. A data carrier comprising a data circuit arranged on a substrate and data transmission means being connected to the data circuit wherein the data carrier comprises at least one strain gauge means being adapted to measure strains exerted on the substrate and to transmit a deactivating signal to the data circuit if the measured strains exceed a defined deactivating strain threshold, the data circuit being adapted to interrupt a data exchange with an external data reader/writer via the data transmission means, if the data circuit receives the deactivating signal.

2. The data carrier as claimed in claim 1, wherein the strain gauge means comprise at least one strain sensor arranged on or in the substrate and a strain evaluating circuit having a measuring input that is connected to the strain sensor, the strain sensor delivering a physical quantity that corresponds to the strains exerted on the substrate, and the strain evaluating circuit being adapted to compare the physical quantity delivered by the strain sensor with a threshold value of the physical quantity that corresponds to a deactivating strain threshold and to generate the deactivating signal if the physical quantity of the strain sensor exceeds the threshold value of the physical quantity.

3. The data carrier as claimed in claim 2, wherein the at least one strain sensor comprises at least one electric resistor having a resistance value that varies with the strain exerted on the resistor.

4. The data carrier as claimed in claim 3, wherein the electric resistor is configured as a poly resistor.

5. The data carrier as claimed in claim 3, wherein the electric resistor is arranged on or in the substrate in a meandering configuration.

6. The data carrier according to claim 2, wherein the at least one strain sensor is arranged in a peripheral region of the substrate.

7. The data carrier according to claim 2, wherein the at least one strain sensor encompasses the data circuit at least partly.

8. The data carrier according to claim 3, wherein the cross-sectional area and/or the meandering shape of the electric resistor is varied in different sections of the electric resistor.

9. The data carrier according to claim 2, wherein at least a first strain sensor is arranged on an upper surface or embedded in an upper layer of the substrate and at least a second strain sensor is arranged on a lower surface or embedded in a lower layer of the substrate, preferably the first and second strain sensors being arranged in alignment with each other on opposite surfaces or layers, and a difference between output signals of the first and second strain sensors being used to evaluate the strain exerted on the substrate.

10. The data carrier according to claim 2, wherein a plurality of strain sensors are provided, the output signals of the plurality of strain sensors are evaluated independently, and optionally different deactivating strain thresholds are defined for the strain sensors.

11. The data carrier according to claim 3, wherein the electrical resistor is switched into a bridge circuit, the bridge circuit being adapted to measure the resistance of the electrical resistor.

12. The data carrier according to claim 9, wherein the first and the second strain sensors are configured as strain-dependent resistors which are switched into a bridge circuit, the bridge circuit being adapted to measure the difference between the resistance values of the two strain-dependent resistors.

13. The data carrier according to claim 1, wherein the interruption of data exchange via the data transmission means is maintained as long as the deactivating signal occurs.

14. The data carrier according to claim 1, wherein a temporary occurrence of the deactivating signal is permanently stored in the data circuit.

15. The data carrier according to claim 1, wherein upon the temporary occurrence of the deactivating signal, the data exchange between the data carrier and the external data reader/writer is permanently interrupted.

16. The data carrier according to claim 1, wherein the strain gauge means are adapted to transmit a damage signal to the data circuit if the measured strains exceed a damaging strain threshold, the data circuit being adapted to permanently interrupt the data exchange with the external reader/writer via the data transmission means if the damage signal is received by the data circuit.

17. The data carrier according to claim 2, wherein temperature-dependent changes of the output signal of the strain sensor (6) are monitored and logged in the data circuit.

* * * * *